Patented June 17, 1930

1,765,142

UNITED STATES PATENT OFFICE

ERICH FISCHER AND CARL ERICH MÜLLER, OF HOCHST-ON-THE-MAIN, GERMANY, ASSIGNORS TO GENERAL ANILINE WORKS, INC., OF NEW YORK, N. Y., A CORPORATION OF DELAWARE

PROCESS FOR DYEING AND PRINTING CELLULOSE ESTERS AND CELLULOSE ETHERS

No Drawing. Application filed April 20, 1927, Serial No. 185,355, and in Germany April 23, 1926.

Our present invention relates to a process for dyeing and printing cellulose esters and cellulose ethers and to the dyed cellulose derivatives thus obtainable.

We have found that the azo dyestuffs of the general formula:

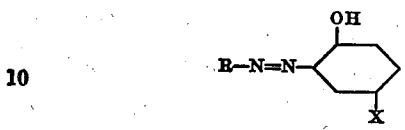

wherein R represents an aryl group which may be substituted but does not contain more than one sulfonic acid group and X represents a monovalent substituent, yield excellent yellow to orange dyeings and prints upon cellulose esters and ethers. It is remarkable that the dyeings thus obtainable do not show any phototrope effect, i. e., they do not temporarily lose their yellow color when being exposed for a short time to light regaining it afterwards in the dark. This holds true even when they are mixed with red or blue. Therefore, the dyestuffs to be used according to our invention are particularly useful for the preparation of mixed shades. Moreover, the dyestuffs in question yield dyeings of particularly good properties as to fastness to light and chlorine.

The following examples serve to illustrate our invention but they are not intended to limit it thereto:

1. 1 kilo of acetate silk is dyed from ¾ to 1 hour at 60–70° C. in a dyebath containing 20–25 liters of water in which 20 g. of the dyestuff: para-phenylenediamine → para-cresol of the following formula:

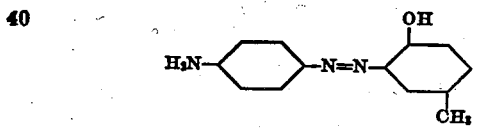

are dissolved. In this manner a vivid golden-yellow dyeing of good fastness to light and chlorine is obtained.

2. If for the dyestuff as used in the foregoing example is substituted the same quantity of the dyestuff: acetyl-para-phenylenediamine → para-cresol having the following formula:

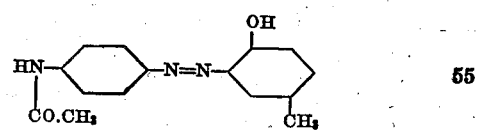

there is produced on the acetate silk a beautiful greenish-yellow dyeing of very good properties as to fastness. The dyestuff: meta-chloraniline → para-cresol as well as the dyestuff para-phenylenediamine-ortho-sulfonic acid → para-cresol dyes the fiber a beautiful yellow shade.

In the following claims the term "dyeing" is intended to include "printing" and any other dyeing processes.

We claim:

1. The process which comprises dyeing a compound of the group consisting of cellulose esters and ethers with a mono-azo dye of the general formula:

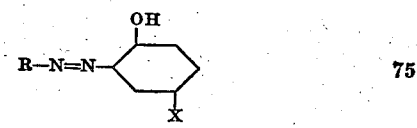

wherein R represents an aryl residue which may be substituted but does not contain more than one sulfonic acid group and X represents a monovalent substituent.

2. The process which comprises dyeing a compound of the group consisting of cellulose esters and ethers with a mono-azo dye of the general formula:

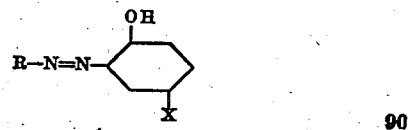

wherein R represents a residue of the benzene series which may be substituted but does not contain more than one sulfonic acid group and X represents a monovalent substituent.

3. The process which comprises dyeing a compound of the group consisting of cellulose esters and ethers with a mono-azo dye of the general formula:

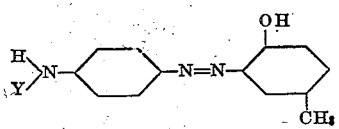

wherein Y represents hydrogen or an acidyl group.

4. The process which comprises dyeing a compound of the group consisting of cellulose esters and ethers with the mono-azo dye of the following formula:

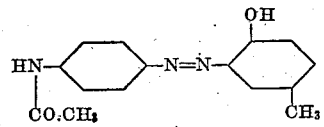

5. A compound of the group consisting of cellulose esters and ethers, dyed with a mono-azo dye of the general formula:

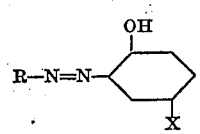

wherein R represents an aryl residue which may be substituted but does not contain more than one sulfonic acid group and X represents a monovalent substituent.

6. A compound of the group consisting of cellulose esters and ethers, dyed with a mono-azo dye of the general formula:

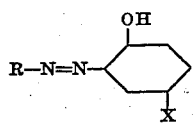

wherein R represents a residue of the benzene series which may be substituted but does not contain more than one sulfonic acid group and X represents a monovalent substitutent.

7. A compound of the group consisting of cellulose esters and ethers, dyed with a mono-azo dye of the general formula:

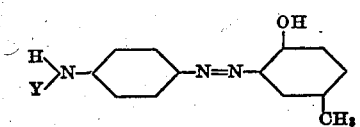

wherein Y represents hydrogen or an acidyl group.

8. A compound of the group consisting of cellulose esters and ethers, dyed with a mono-azo dye of the following formula:

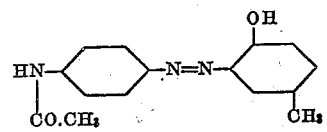

In testimony whereof we affix our signatures.

ERICH FISCHER.
CARL ERICH MÜLLER.